United States Patent [19]

Ando

[11] Patent Number: 5,758,010
[45] Date of Patent: May 26, 1998

[54] REPRODUCING APPARATUS WITH TIME BASE CORRECTOR

[75] Inventor: Hirotake Ando, Tokyo, Japan

[73] Assignee: Canon Kabushiki Kaisha, Tokyo, Japan

[21] Appl. No.: 329,777

[22] Filed: Oct. 27, 1994

Related U.S. Application Data

[60] Continuation of Ser. No. 934,931, Aug. 25, 1992, abandoned, which is a division of Ser. No. 703,600, May 20, 1991, Pat. No. 5,220,736, which is a continuation of Ser. No. 565,203, Aug. 8, 1990, abandoned, which is a continuation of Ser. No. 164,057, Mar. 3, 1988, abandoned.

[30] Foreign Application Priority Data

Mar. 19, 1987 [JP] Japan ........................... 62-062667
Mar. 19, 1987 [JP] Japan ........................... 62-062668

[51] Int. Cl.$^6$ ........................................ H04N 5/95
[52] U.S. Cl. ........................ 386/87; 386/91; 360/73.08
[58] Field of Search ........................ 360/69, 70, 71, 360/73.04–73.06, 73.08, 10.1–10.3, 36.1–36.2, 51; 328/155; 386/14, 20, 87, 91; 348/497

[56] References Cited

U.S. PATENT DOCUMENTS

| | | | |
|---|---|---|---|
| 4,345,279 | 8/1982 | Kimura | 360/36.1 |
| 4,577,241 | 3/1986 | Wilkinson | 360/51 |
| 4,796,123 | 1/1989 | Takeuchi et al. | 360/10.3 |
| 5,047,879 | 9/1991 | Fukatsu et al. | 360/73.04 X |

*Primary Examiner*—Andrew L. Sniezek
*Attorney, Agent, or Firm*—Robin, Blecker & Daley

[57] ABSTRACT

A reproducing apparatus for reproducing a signal by moving a record bearing medium and a reproducing head relative to each other is provided with a time base corrector for correcting the time base of the signal reproduced. The time base corrector is characterized in that the operating state thereof is changed from one state over to another according to whether or not the controlled movement of the medium and the head relative to each other is in a steady state.

23 Claims, 2 Drawing Sheets

# REPRODUCING APPARATUS WITH TIME BASE CORRECTOR

This is a continuation application under 37 CFR 1.62 of prior application Ser. No. 07/934,931, filed Aug. 25, 1992, now abandoned, which is a divisional of Ser. No. 07/703,600, filed May 20, 1991, now U.S. Pat. No. 5,220,736, which is a continuation of Ser. No. 07/565,203, filed Aug. 8, 1990, abandoned, which is a continuation of Ser. No. 07/164,057, filed Mar. 3, 1988, abandoned.

BACKGROUND OF THE INVENTION

1. Field of the Invention

This invention relates to a signal reproducing apparatus and more particularly to a signal reproducing apparatus which is provided with a circuit for correcting the time base of a reproduced signal.

2. Description of the Related Art

In the conventional signal reproducing apparatus of the above stated kind, such as a video tape recorder (hereinafter referred to as VTR) of the known low band converting type, a time base correction circuit (or a time base corrector, hereinafter referred to as TBC) has been arranged to give a time base corrected carrier chrominance signal by stepping up a horizontal synchronizing signal which is extracted from a reproduced video signal by means of a PLL circuit to a low-band converted carrier chrominance signal frequency; and by frequency converting a low-band converted carrier chrominance signal with a signal obtained by frequency converting a signal produced from a voltage controlled oscillator (hereinafter referred to as VCO) which is controlled on the basis of the stepped up horizontal synchronizing signal and a phase difference between the output of a reference oscillator and a reproduced color burst signal.

In addition to correcting the time base of the carrier chrominance signal, there has been contrived a method for correcting, at the same time, the time base of a luminance signal. In accordance with this method, the reproduced video signal is supplied to a variable delay line consisting of a CCD delay line; time base variations are extracted by using the above stated horizontal synchronizing signal; and the delay time obtainable by the variable delay line is controlled for correcting the time base of the luminance signal.

The above stated TBC of the conventional VTR has presented the following problem: In shifting from one to another the so-called normal reproduction mode and a special reproduction mode such as a high speed search mode or a slow reproduction mode, the synchronizing signal extracted from the reproduced video signal is apt to be disturbed by the dislocated servo lock of frequency and phase of the rotation of a drum and a capstan. The TBC malfunctions when the frequency and phase deviations come to exceed the correctable range of the TBC. The malfunction has disturbed a picture thus reproduced. To prevent such disturbance of the reproduced picture, varied methods have been developed including among others: A method of not allowing the TBC to operate in the special reproduction modes. Another method wherein a signal indicative of each special reproduction mode is produced; and after changeover to a special reproduction mode, the TBC is kept inoperative during a period of time set for the mode indicated by the signal.

The former method, however, prohibits the use of the TBC or special reproduction. Meanwhile, the latter makes the arrangement of the apparatus more complex accordingly as the number of special reproduction modes increases. Besides, it is difficult to set the periods of time during which the TBC must be kept inoperative.

Further, there are occurrences of some time base variations that are hardly pursuable by the TBC due to some reason other than the special reproduction. In such a case, the conventional time base correction circuit rather has brought about some adverse effect on reproduced signals.

SUMMARY OF THE INVENTION

In view of the above stated problems of the prior art, it is an object of this invention to provide a reproducing apparatus which is capable of adequately performing the time base correction under any conditions.

It is another object of the invention to provide a reproducing apparatus which is capable of performing the time base correction during the special reproduction.

Under these objects, a signal reproducing apparatus arranged according to this invention as an embodiment thereof comprises: reproducing means for reproducing a recorded signal by tracing a record bearing medium; time base correction means for correcting the time base of the signal reproduced by the reproducing means; transportation means for transporting the record bearing medium; and switch-over means for changing over a transportation speed of said record bearing medium transported by said transportation means and for changing over a response speed of the time base correction means according to the changeover of the transportation speed.

It is a further object of the invention to prevent a reproduced signal from being deteriorated by any faulty action of a time base correction circuit.

Under that object, a signal reproducing apparatus arranged according to the invention as another embodiment thereof comprises: reproducing means for reproducing a recorded signal by tracing a record bearing medium; time base correction means for correcting the time base of the signal reproduced by the reproducing means; moving means for moving the record bearing medium and the reproducing means relative to each other; control means arranged to act on the moving means for controlling the relative movement of the record bearing medium and the reproducing means to be in a predetermined steady state; detecting means for detecting that the relative movement of the record bearing medium and the reproducing means is brought into the steady state by the control means; and switch-over means for changing over an acting state of the time base correction means according to an output of the detecting means. The above and other objects and features of the invention will become apparent from the following detailed description of embodiments thereof taken in connection with the accompanying drawings.

DETAILED DESCRIPTION OF THE PREFERRED EMBODIMENTS

Figure 1:
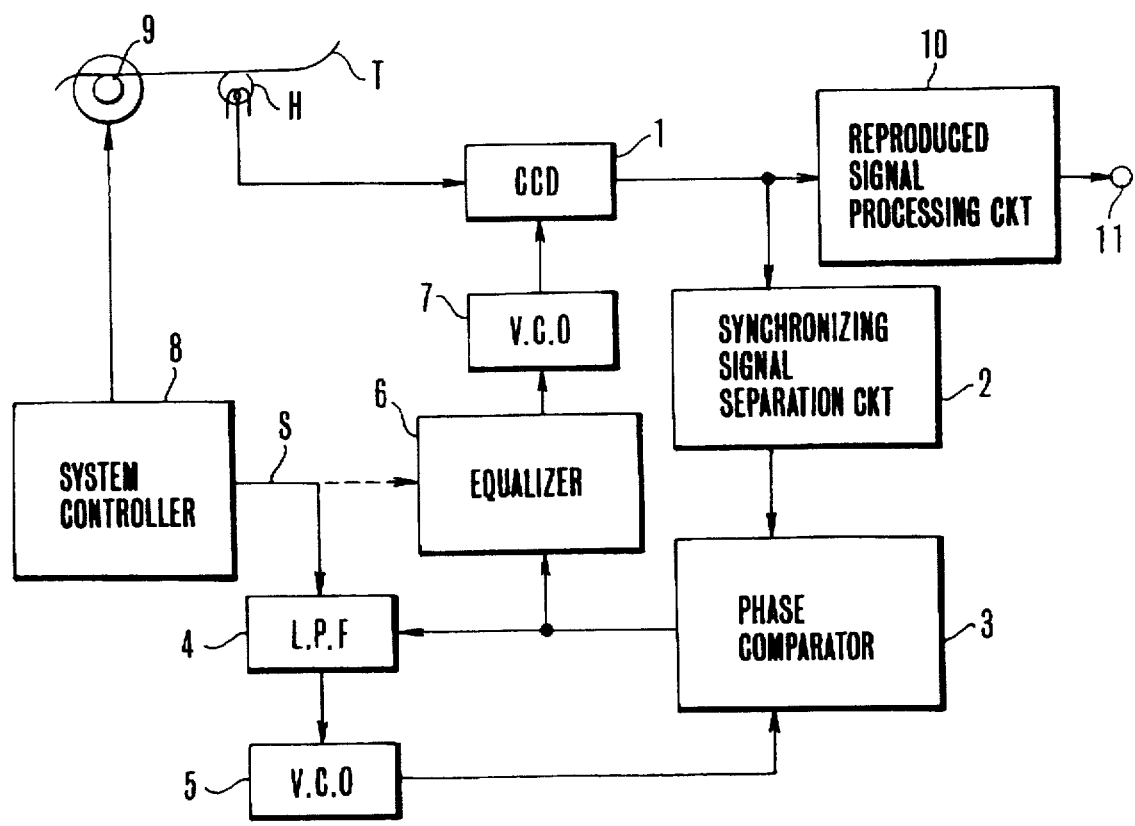
FIG. 1 is a block diagram showing in outline the essential parts of a VTR arranged as an embodiment of this invention.

This invention is applied to VTRs in the cases of embodiments described below:

FIG. 1 is a block diagram showing in outline the essential parts of a VTR which is arranged according to this invention as an embodiment thereof. Referring to FIG. 1, a charge coupled device (CCD) 1 is employed as a variable delay element. A recorded video signal is reproduced from a magnetic tape T by means of a rotary head H and is supplied to the CCD 1. A synchronizing signal separation circuit 2 is arranged to separate a horizontal synchronizing signal from the video signal produced from the CCD 1. A phase comparator 3 is arranged to have its output supplied via a low-pass filter (LPF) 4 to a voltage controlled oscillator (hereinafter referred to as VCO) 5. The phase comparator 3 compares the phase of the reproduced horizontal synchronizing signal separated by the synchronizing signal separation circuit 2 with the oscillation frequency of the VCO 5. The output of the phase comparator 3 is also supplied to another VCO 7 via an equalizer 6. The frequency of the VCO 7 is used as clock signal for the above stated CCD 1. A phase locked loop (hereinafter referred to as PLL) is formed jointly by the phase comparator 3, the LPF 4 and the VCO 5. The VTR has varied operation modes including a normal reproduction mode, a still picture reproduction mode, a slow motion reproduction mode, a high speed search reproduction mode, etc. A system controller 8 is arranged to control change-over from one mode to another among these varied modes. A capstan 9 is arranged to transport the magnetic tape T at a speed determined for each of these modes designated by the system controller 8. A reproduced signal processing circuit 10 is arranged to perform a known signal processing action on the video signal which has been time base corrected by the CCD 1. An output terminal 11 is arranged to produce the video signal processed by the circuit 10.

In the normal reproduction mode, the capstan 9 is caused to transport the magnetic tape T at the same speed as a speed at which recording has been performed. The synchronizing signal separation circuit 2 extracts the horizontal synchronizing signal from the reproduced video signal after the signal has passed through the CCD 1. The extracted horizontal synchronizing signal is supplied to one of the input terminals of the phase comparator 3. The output of the phase comparator 3 causes through the LPF 4 the input voltage of the VCO 5 to vary. Then, the oscillation frequency of the VCO 5 varies accordingly. The oscillation output of the VCO 5 is phase compared with -the reproduced horizontal synchronizing signal by the phase comparator 3. As a result of the phase comparison, a time base error signal is produced from the phase comparator 3. The time base error signal is supplied to the equalizer 6, which performs phase compensation. Then, the phase compensated time base error signal produced from the equalizer 6 is supplied to the VCO 7. This causes the oscillation frequency of the VCO 7. The VCO 7 then produces an output, which is applied to the CCD 1 as a clock signal. The time base of the reproduced video signal is changed as necessary by varying the delay time of the CCD 1 with the CCD 1 thus being driven by the clock signal.

In the case of high speed search reproduction mode which is one of the special reproduction modes and is performed, for example, to look up a part of the record, the system controller 8 causes the capstan 9 to transport the tape T at a high speed. The system controller 8 then also produces a signal S indicative of the search being conducted. While the search signal S is being produced, the response speed of the VCO 5 is changed by changing the time constant (or gain) of the LPF 4. By this, in the high speed search mode, a time base error signal is produced from the phase comparator 3 to change the response speed of the whole VTR. The time base correction is thus carried out, in the high speed search mode, in the same manner as in the normal reproduction mode.

Further, while the time constant (or gain) of the LPF 4 is arranged to be changed in the special reproduction mode in the case of this embodiment, this arrangement may be changed to make adjustment, for example, by using the equalizer 6, instead of the LPF 4. In that instance, the frequency of the VCO 7 is changed by changing the output voltage of the equalizer 6. Either of these different arrangements may be selected according to circumstances. While the high speed search reproduction is taken up by way of example in the above description, this invention is advantageously applicable also to other special reproduction modes such as the slow reproduction mode, the still picture reproduction mode, etc. In the case of slow reproduction or still reproduction, for example, the time constant or the LPF 4 or the characteristic of the equalizer 6 is changed to adjust the response characteristic of the time base correction circuit, so that the time base correction can be adequately accomplished at a response speed which is most apposite to any of the modes selected. In this instance, the system controller 8 produces the signal S according to the mode selected.

As described in the foregoing, the rotary head type reproducing apparatus according to the invention is capable of adequately performing the time base correction in any of the different operation modes by virtue of a slight addition to the circuit arrangement of the TBC circuit provided for normal production.

Figure 2:
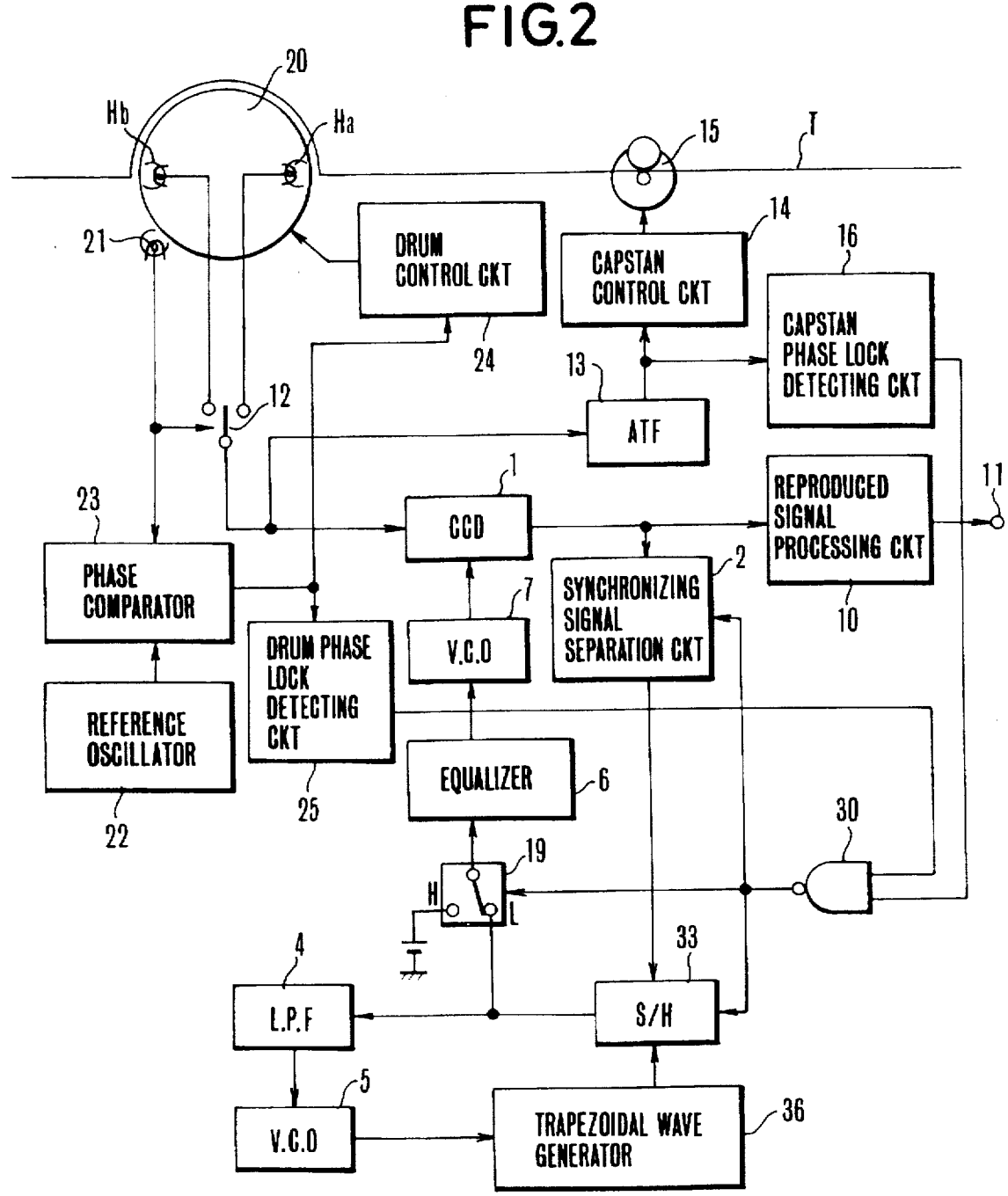
FIG. 2 is a block diagram showing in outline the essential parts of a VTR arranged as another embodiment of this invention.

FIG. 2 shows in outline the essential parts of a VTR arranged according to this invention as another embodiment thereof. In FIG. 2, the same components as those of the embodiment shown in FIG. 1 are indicated by the same reference numerals. The illustration includes a magnetic tape T; a rotary drum 20 which is wound around more than 180 degrees by the magnetic tape T; rotary magnetic heads Ha and Hb which are mounted on the rotary drum 20 at a phase difference of at least 180 degrees between them; and a switch 12 which is arranged to alternately produce signals reproduced by these heads Ha and Hb. A sample-and-hold (hereinafter referred to as S/H) circuit 33 is arranged to operate using a horizontal synchronizing signal which is extracted by the synchronizing signal separation circuit 2 as sampling pulses. The output of the S/H circuit 33 is arranged to be supplied via the LPF (low-pass filter) 4 to the VCO 5. The output of the VCO 5 is arranged to be transformed into a trapezoidal wave by a trapezoidal wave generator 36. The trapezoidal wave thus obtained is supplied to the S/H circuit 33. The S/H circuit 33, the LPF 4, the VCO 5 and the trapezoidal wave generator 36 jointly form a PLL circuit. The output of the S/H circuit 33 is also supplied via a switch 19 and the equalizer 6 to the VCO 7 to vary thereby the oscillation frequency of the VCO 7. The output of the VCO 7 is arranged to be used as a clock signal for driving the CCD 1.

The reproduced video signal which is produced from the CCD 1 is supplied to the reproduced signal processing circuit 10. The circuit 10 then performs a known signal processing action. The signal thus processed is supplied via the output terminal 11 to an applicable device such a san image receiver.

The servo circuit of the embodiment operates in the following manner: The reproduced signal from the switch 12 is supplied to a tracking control signal generating circuit 13 (hereinafter referred to as ATF circuit) which is arranged to operate in accordance with the known four-frequency method. The ATF circuit 13 then produces a tracking error signal (hereinafter referred to as ATF signal) which is obtained by performing a known process on reproduced pilot signals. In the normal reproduction mode, this ATF signal is supplied to a capstan control circuit 14 as a tracking control signal. The rotation of the capstan 15 is then controlled in such a manner that the heads Ha and Hb trace one by one recording tracks formed on the tape T in the so-called just-track state in which the middle part of each of the heads Ha and Hb coincides with the center line of each applicable track. In case that the system controller (which is not shown) produces an instruction for special reproduction, such as slow reproduction, high speed search reproduction, or some other special reproduction, the ATF circuit 13 sample and holds the ATF signal at an applicable predetermined timing before supplying it to the capstan control circuit 14 as the tracking control signal. The sample-and-holding timing is determined in such a way as to obtain the above stated just-track state. For example, in the case of the high speed search reproduction mode, the heads Ha and Hb are caused to be at a predetermined rotation phase.

A stable servo state can be considered to have been attained if the absolute value of the level of the tracking control signal is low, irrespective as to whether the VTR is in the normal reproduction mode or in a special reproduction mode. A capstan phase lock detecting circuit 16 is arranged to produce its output at a high level when the capstan control system is in a stable state (or a servo lock state) as judged from the level of the tracking control signal.

Meanwhile, a phase detector 21 is arranged to detect the rotation phase of the drum 20 and to produce pulses. The pulse output of the phase detector 21 is phase compared by a phase comparator 23 with the signal output of a reference oscillator 22 which is arranged to oscillate at a frequency corresponding to a desired rotational frequency. The signal output of the phase comparator 23 is supplied to a drum control circuit 24 as a drum rotation phase control signal. The drum 20 is controlled to rotate at a given phase in accordance with this rotation phase control signal. A servo for the phase of the drum 20 can be considered to be in a stable state if this rotation phase control signal is at a low level. This is arranged to be detected by a drum phase lock detector 25. The detector 25 is arranged to produce its output at a high level when the phase servo of the rotary drum is in a stable state (a servo lock state).

Further, the description given hereinafter is on the assumption that the rotating speed of the drum 20 and that of the capstan 15 are also in servo lock states when the rotation phase of the drum 20 and that of the capstan 15 are in their servo lock states.

In the circuit of FIG. 2, when the frequency and the phase of the drum 20 and those of the capstan 15 are both in locked states during normal reproduction, the horizontal synchronizing signal is extracted by the synchronizing signal separation circuit 2 from the, reproduced video signal which has passed the CCD 1. The horizontal synchronizing signal thus extracted is produced in the form of sampling pulses. This pulse output of the circuit 2 is supplied to the S/H circuit 33. However, since the S/H circuit 33 forms the PLL circuit in conjunction with the LPF 4, the VCO 5 and the trapezoidal wave generator 36, the output of the S/H circuit 33 is used as a time base error portion of the reproduced signal. The output of the S/H circuit 33 is supplied via the switch 19 to the equalizer 6 to be phase compensated by the equalizer 6. The output of the S/H circuit 33 which is thus phase compensated is supplied to the VCO 7 to change thereby the oscillation frequency of the VCO 7. The output of the VCO 7 is used as a clock signal for driving the CCD 1. The CCD 1 is thus driven to correct the time base variations of the reproduced video signal.

In the event of special reproduction, when, the phase servo of one of or those of both of the drum and capstan are not in the servo lock state, a NAND gate 30 turns on. The signal output of the NAND gate 30 causes the synchronizing signal separation circuit 2 to stop operating. As a result, the sample pulses from the S/H circuit 33 ceases to come. Further, the output of the S/H circuit 33 is fixed at such a given voltage that causes the VCO 5 to oscillate at the frequency of the horizontal synchronizing signal. Further, the output of the NAND gate 30 shifts the position of the switch 19 to a terminal on a fixed or constant voltage side thereof (on one side H thereof). The fixed constant voltage is supplied via the equalizer 6 to the VCO 7. This makes the input voltage of the VCO 7 unvarying. Accordingly, the frequency of the clock signal applied to the CCD 1 also becomes unvarying. The time base correcting action then comes to a stop.

With the embodiment arranged as described in the foregoing, in the event of occurrence of a large tracking error at the time of change-over between normal reproduction and special reproduction, the level of the output of the capstan phase lock detecting circuit 16 becomes high to prevent the reproduced video signal from being affected by the action of the time base correction circuit in the event of the large tracking error. Further, since the operation of the time base correction circuit is put to a pause only for a minimum necessary period of time, the reproduced video signal is obtainable with the time base correction circuit used as much as possible. The embodiment thus ensures that a video signal can be automatically produced in the best state.

The operation of the time base correction circuit can be promptly brought to a stop in the event of occurrence of an abnormality in the rotation of the drum during the process of building up of the drum rotation or due to some other reason. Therefore, the reproduced video signal can be prevented from being affected by such abnormality.

In accordance with the arrangement of the rotary head type reproducing apparatus embodying this invention as described in the foregoing, the time base correction circuit is allowed to automatically operate only when it is adequately operable. The arrangement prevents the reproduced signal from being deteriorated by any faulty action of the time base correction circuit. Besides, the embodiment is arranged to be capable of giving an adequately reproduced signal by accomplishing the time base correction to a maximum possible degree.

What is claimed is:

1. A signal reproducing apparatus comprising:
  a) reproducing means for reproducing a signal containing a time base fluctuation from a record bearing medium;
  b) time base correction means for correcting a time base fluctuation of said signal reproduced by said reproducing means by using a clock signal;
  c) clock signal forming means for forming said clock signal, said clock signal forming means having a response speed dependent on construction of said clock signal forming means;
  d) transportation means for transporting said record bearing medium; and
  e) system control means for setting a transportation speed of said record bearing medium transported by said transportation means and for setting a response speed of said clock signal forming means with respect to the time base fluctuation so that said system control means increases transportation speed of the record bearing medium and increases the response speed of said clock signal forming means responsively to time base fluctuation.

2. An apparatus according to claim 1, wherein said time base correction means includes a variable delay circuit arranged to receive the signal reproduced by said reproducing means and to be operated by said clock signal.

3. An apparatus according to claim 2, wherein said recorded signal is a video signal; said clock signal forming means includes a synchronizing signal separation circuit for separating a synchronizing signal from said video signal produced from said variable delay circuit and a phase locked loop circuit arranged to receive the synchronizing signal separated by said synchronizing signal separation circuit and to produce said clock signal; and said variable delay circuit is arranged to be controlled on the basis of said clock signal.

4. An apparatus according to claim 1, wherein said system control means is arranged to be able to set the transportation speed of said record bearing medium transported by said transportation means at a first speed which is the same as a recording speed employed in recording said recorded signal and at a second speed which differs from said first speed; and to set the response speed of said time base correction means faster when said transportation speed is set at said second speed than when said transportation speed is set at said first speed.

5. A reproducing apparatus comprising:

a) reproducing means for reproducing a signal from a record bearing medium;

b) moving means for moving said record bearing medium;

c) time base correction means for correcting a time base fluctuation of the signal reproduced by said reproducing means by using a clock signal, said time base correction means having a response speed being dependent on construction of said time base correction means; and d) control means for setting a response speed of said time base correction means with respect to the time base fluctuation in accordance with a transportation speed of said record bearing medium, said control means providing such a control that the response speed of said time base correction means is set up to a predetermined speed, according as the transportation speed of said record bearing medium is at a speed corresponding to a recording speed of the signal reproduced by said reproducing means, and the response speed of said time base correction means is increased from said predetermined speed, according as the transportation speed of said record bearing medium is at a speed different from the speed corresponding to said recording speed.

6. An apparatus according to claim 5, wherein said time base correction means includes a PLL circuit, and said system control means is arranged to increase a response speed of said PLL circuit.

7. An apparatus according to claim 6, wherein said PLL circuit includes a filter, and said system control means is further arranged to increase the response speed of said PLL circuit by controlling a characteristic of said filter.

8. An apparatus according to claim 5, wherein said control means provides such a control that when the apparatus is set in an ordinary reproducing mode, the response speed of said time base correction means is set up to said predetermined speed, and when the transportation speed is set in a mode other than said ordinary reproducing mode, the response speed of said time base correction means is set up to a speed faster than said predetermined speed.

9. A signal reproducing apparatus, comprising:

(a) reproducing means for reproducing a video signal from a record bearing medium;

(b) clock signal generating means for forming a clock signal having a time base fluctuation according to that of the video signal reproduced by said reproducing means, said clock signal generating means including a synchronization signal extracting means for extracting a synchronization signal from the video signal reproduced by said reproducing means, and a PLL means for generating a signal which is phase-synchronized with the synchronization signal, wherein an output of said PLL means is outputted in the form of said clock signal, said clock signal generating means having a response speed being dependent on construction of said clock signal generating means;

(c) time base correction means for correcting the time basis of the video signal reproduced by said reproducing means by using said clock signal, said time base correction means including variable delay means for receiving the video signal reproduced by said reproducing means, said variable delay means being controlled on the basis of said clock signal;

(d) transportation means for transporting said record bearing medium; and (e) control means for setting a response speed of said clock signal generating means with respect to the time base fluctuation in accordance with a transportation speed of said record bearing medium, said control means providing such a control that the response speed of said clock signal generating means is set up to a predetermined speed, according as the transportation speed of said record bearing medium is at a speed corresponding to a recording speed of the signal reproduced by said reproducing means, and the response speed of said clock signal generating means is increased from said predetermined speed, according as the transportation speed of said record bearing medium is at a speed different from the speed corresponding to said recording speed.

10. An apparatus according to claim 9, wherein said control means provides such a control that when the apparatus is set in an ordinary reproducing mode, the response speed of said clock signal generating means is set up to said predetermined speed, and when the apparatus is set in a mode other than said ordinary reproducing mode, the response speed of said clock signal forming means is set up to a speed faster than said predetermined speed.

11. An apparatus according to claim 9, wherein said PLL means includes transportation comparing means for receiving said synchronization signal as one input thereof, filter means for receiving an output of said transportation comparing means, and voltage control oscillation means for receiving an output of said filter means, and wherein said transportation comparing means receives the output of said voltage control oscillation means as another input thereof.

12. An apparatus according to claim 11, wherein said control means controls a time constant of said filter means so that the response speed of said clock signal generating means is increased.

13. An apparatus according to claim 11, wherein said control means controls a gain of said filter means so that the response speed of said clock signal generating means is increased.

14. An apparatus according to claim 9, further comprising signal processing means for practicing a predetermined process for the output signal of said time base correction means to convert it into a signal format suitable for recording.

15. An apparatus according to claim 9, wherein said reproducing means has a head for reproducing the video signal by tracing a tape-shaped record bearing medium on which a plurality of tracks are formed.

16. An apparatus according to claim 15, further comprising error information generating means for generating tracking error information between a track which said head traces and said head with the use of the video signal supplied to said time base correction means.

17. A signal reproducing apparatus, comprising:
   a) reproducing means for reproducing a signal from a recording medium;
   b) clock signal generating means for generating a clock signal, said clock signal generating means having a response speed being dependent on construction of said clock signal generating means;
   c) processing means for receiving the signal reproduced by said reproducing means and the clock signal and for processing the received signal by using the clock signal;
   d) transporting means for transporting the recording medium; and
   e) control means for setting a transportation speed of said transportation means and a response speed of said clock signal generating means, jointly, with respect to a time base fluctuation of the signal reproduced by said reproducing means.

18. An apparatus according to claim 17, wherein said control means jointly increases said transportation speed and said response speed.

19. An apparatus according to claim 17, wherein said clock generating means has phase detecting means for detecting a phase difference between the clock signal and a reproducing signal, a filter to which an output of said phase detecting means is input and means producing output signals whose frequencies vary in accordance with and output of said filter.

20. An apparatus according to claim 19, wherein said control means controls a time constant of said filter so that the response speed of said clock signal generating means is increased.

21. An apparatus according to claim 19, wherein said control means controls a gain of said filter so that the response speed of said clock signal generating means is increased.

22. An apparatus according to claim 17, wherein said processing means includes means which operates according to said clock and delays a signal reproduced by said reproducing means.

23. An apparatus according to claim 17, wherein said reproducing means has a head for reproducing the video signal by tracing a tape-shaped record bearing medium on which a plurality of tracks are formed.

* * * * *

UNITED STATES PATENT AND TRADEMARK OFFICE
CERTIFICATE OF CORRECTION

PATENT NO. : 5,758,010

DATED : May 26, 1998

INVENTOR(S) : Hirotake Ando

It is certified that error appears in the above-identified patent and that said Letters Patent are hereby corrected as shown below:

Col. 3, line 43, delete "-".

Col. 6, line 6, delete "to come".

Signed and Sealed this

Twenty-ninth Day of December, 1998

Attest:

BRUCE LEHMAN

Attesting Officer

Commissioner of Patents and Trademarks